Sept. 2, 1958     H. EISMANN ET AL     2,849,918
PHOTOGRAPHIC OBJECTIVE
Filed March 15, 1955
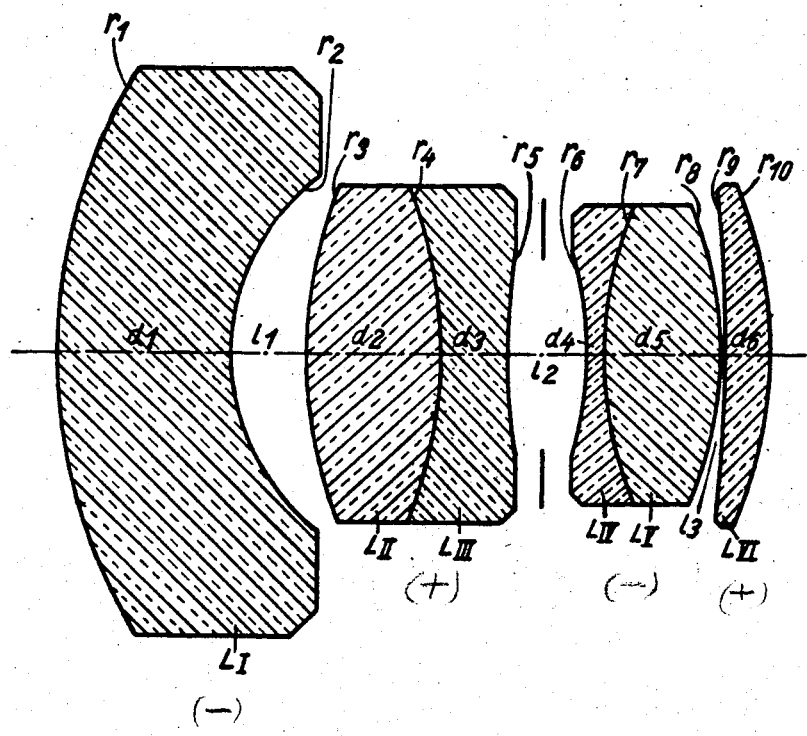

United States Patent Office 2,849,918
Patented Sept. 2, 1958

2,849,918
PHOTOGRAPHIC OBJECTIVE

Helmut Eismann, Heidenheim (Brenz), and Günther Lange, Konigsbronn, Germany, assignors to Carl Zeiss of Heidenheim (Brenz), Wurttemberg, Germany Application March 15, 1955, Serial No. 494,355

Claims priority, application Germany April 17, 1954

12 Claims. (Cl. 88—57)

Object of the present invention is a photographic objective consisting of at least four components separated from one another by air spaces, which shows a relatively great back focal length and for this purpose in accordance with the invention is constructed unsymmetrically in such fashion, that the front component facing the object to be photographed is dispersive and the component lying immediately before the diaphragm is collective, while the component immediately following the diaphragm possesses such a slight dispersive, refractive power that its focal length in absolute amount is greater than the fourfold amount of the objective focal length $f$, and that the rear element is collective, whereby the four mentioned elements are all meniscus shaped and bent concave towards the diaphragm.

In order to produce in an objective constructed in this manner a favorable compromise for the excellence of image with the object of keeping the individual image defects as small as possible, it is advisable to apply further supplementary measures, in accordance with one or several of the stipulations specified in the following:

The over-all length shall lie within the limits of $0.7 \cdot f$ and $2.5 \cdot f$.

The vertex distance between the first surface and that lying immediately before the diaphragm shall be greater than the vertex distance between the surface lying immediately behind the diaphragm and the last surface.

The vertex distance between the first surface and the collective outer surface, turned away from the diaphragm, of the dispersive component lying immediately behind the diaphragm shall be greater than the arithmetic mean of the absolute amounts of the radii of these two surfaces, but smaller than the double of this mean, whereby this arithmetic mean for its part lies within the limits of $\frac{1}{2} \cdot f$ and $f$.

The vertex distance between the concave surface of the front component turned towards the diaphragm and the concave surface immediately following the diaphragm shall be greater than the arithmetic mean of the absolute amounts of the radii of these two surfaces, but smaller than the fivefold amount of this arithmetic mean, whereby this for its part lies within the limits of $\frac{1}{4} \cdot f$ and $\frac{1}{2} \cdot f$.

The collective component lying immediately before the diaphragm shall be cemented, and preferably consist of two lenses of opposite refractive power.

The dispersive component immediately following the diaphragm, shall be cemented, and preferably consist of two lenses of opposite refractive power. In the latter case the lens with the negative refractive power shall possess the higher dispersive power. The cemented surface shall turn its convex side towards the diaphragm and have a radius within the limits of $0.3 \cdot f$ and $f$.

The radius of the first surface of the objective shall likewise lie within the limits of $0.3 \cdot f$ and $f$.

The ratio of the radii of the first surface and of the collective surface, turned towards the front component, of the collective component lying immediately before the diaphragm shall lie within the limits of 0.9 and 2.0.

The front component shall be a simple uncemented lens.

The rear component shall be a simple uncemented lens.

The air space following the front lens shall be smaller than the objective focal length $f$.

The central thickness of the front component shall lie within the limits of $0.05 \cdot f$ and $0.5 \cdot f$.

In the figure of the accompanying illustrative an objective in accordance with the invention is represented in section. In the following adduced table numerical values are specified for an example of such an objective.

In the illustration and in the table are designated: by $r$ the radii of the surfaces; by $d$ the thicknesses of the individual lenses; by $l$ the air separations between the individual components.

The specified values are referred to a focal length $f=1$. The relative aperture amounts to 1:3.5. The available image angle has a magnitude of $\pm 32°$. The back focal length $S'$ amounts to 100.61% of the focal length.

| Lenses | Radii | Thicknesses and distances | $n_d$ | $v$ |
|---|---|---|---|---|
| $L_I$ | $r_1 = +0.724739$ | $d_1 = 0.22496$ | 1.47069 | 67.2 |
|  | $r_2 = +0.301266$ | $l_1 = 0.09082$ |  |  |
| $L_{II}$ | $r_3 = +0.618629$ | $d_2 = 0.17491$ | 1.74400 | 44.7 |
|  | $r_4 = -0.618629$ |  |  |  |
| $L_{III}$ |  | $d_3 = 0.08731$ | 1.53256 | 46.0 |
|  | $r_5 = +0.886507$ | $l_2 = 0.10125$ |  |  |
|  | $r_6 = -0.491383$ |  |  |  |
| $L_{IV}$ |  | $d_4 = 0.02503$ | 1.72151 | 29.3 |
|  | $r_7 = +0.528048$ |  |  |  |
| $L_V$ |  | $d_5 = 0.15358$ | 1.66672 | 48.4 |
|  | $r_8 = -0.520511$ | $l_3 = 0.00284$ |  |  |
|  | $r_9 = -1.928320$ |  |  |  |
| $L_{VI}$ |  | $d_6 = 0.06257$ | 1.74400 | 44.7 |
|  | $r_{10} = -0.584018$ |  |  |  |
| $s' = 1.0061$ |  |  |  |  |

We claim:
1. Unsymmetrical photographic objective comprising at least four components separated by air spaces, the front component facing the object being dispersive and the component lying immediately before the diaphragm being collective, the component immediately following the diaphragm possessing such a slight dispersive refractive power that its focal length in absolute amount is greater than the fourfold amount of the objective focal length $f$, and the rear component being collective, said four mentioned components being all meniscus shaped and bent concave towards the diaphragm, the over-all length of the objective lying within the limits of $0.7 \cdot f$ and $2.5 \cdot f$, the vertex distance between the collective surface of said front component and the concave surface of said component lying immediately before the diaphragm being greater than the vertex distance between the concave surface of the said component lying immediately behind the diaphragm and the rear surface of the said rear component, the vertex distance between the front surface of said front component and the collective outer surface turned away from the diaphragm of said dispersive component lying immediately behind the diaphragm being greater than the arithmetic mean of the absolute amounts of the radii of these two surfaces, but smaller than the double of this mean, said arithmetic mean for its part lying within the limits of $\frac{1}{2} \cdot f$ and $f$, and the vertex distance between the concave surface of said front component and the concave surface of said component immediately following the diaphragm being greater than the arithmetic mean of the absolute amounts of the radii of these two surfaces, but smaller than the fivefold amount of this arithmetic mean, said arithmetic mean lying within the limits of $\frac{1}{4} \cdot f$ and $\frac{1}{2} \cdot f$.

2. Photographic objective according to claim 1, the collective component lying immediately before the diaphragm being cemented, and consisting of two lenses of opposite refractive power.

3. Photographic objective according to claim 1, the dispersive component immediately following the diaphragm being cemented, and consisting of two lenses of opposite refractive power.

4. Photographic objective according to claim 1, the component immediately following the diaphragm consisting of two cemented together lenses of opposite refractive power, the lens with the negative refractive power having the higher dispersion.

5. Photographic objective according to claim 1, the component immediately following the diaphragm consisting of two cemented together lenses of opposite refractive power, the lens with the negative refractive power having the higher dispersion, the cemented surface in the element following the diaphragm turning its convex side towards the diaphragm and having a radius within the limits of $0.3 \cdot f$ and $f$.

6. Photographic objective according to claim 1, the radius of the front surface of said front component lying within the limits of $0.3 \cdot f$ and $f$.

7. Photographic objective according to claim 1, the radius of the front surface of said front component lying within the limits of $0.3 \cdot f$ and $f$, and the ratio of the radii of said front surface and of the collective surface, turned towards said front component, of the collective component lying immediately before the diaphragm lying within the limits of 0.9 and 2.0.

8. Photographic objective according to claim 1, said front component being a simple uncemented lens.

9. Photographic objective according to claim 1, said rear component being a simple uncemented lens.

10. Photographic objective according to claim 1, the air space following the front lens being smaller than the objective focal length $f$.

11. Photographic objective according to claim 1, the axial thickness of the front component lying within the limits of $0.05 \cdot f$ and $0.5 \cdot f$.

12. Photographic objective according to claim 1, consisting of four components, the surface refractive powers ($\Delta n/r$) deviating at most by $\pm 0.5/f$ and the thicknesses ($d$) and the air spaces ($l$) at most by $\pm 0.1 \cdot f$ from the values to be taken from the following numerical example:

| Lenses | Radii | Thicknesses and air spaces | $n_d$ | $v$ | $\Delta n/r$ |
|---|---|---|---|---|---|
| $L_I$ | $r_1=+0.724739 \cdot f$ | $d_1=0.22496 \cdot f$ | 1.47069 | 67.2 | $+0.649461/f$ |
| | $r_2=+0.301266 \cdot f$ | $l_1=0.09982 \cdot f$ | | | $-1.562373/f$ |
| $L_{II}$ | $r_3=+0.618629 \cdot f$ | $d_2=0.17491 \cdot f$ | 1.74400 | 44.7 | $+1.202659/f$ |
| | $r_4=-0.618629 \cdot f$ | | | | $+0.341788/f$ |
| $L_{III}$ | $r_5=+0.896507 \cdot f$ | $d_3=0.08731 \cdot f$ | 1.53256 | 46.0 | $-0.600739/f$ |
| | | $l_2=0.10125 \cdot f$ | | | |
| $L_{IV}$ | $r_6=-0.491383 \cdot f$ | $d_4=0.02503 \cdot f$ | 1.72151 | 29.3 | $-1.468325/f$ |
| | $r_7=+0.528048 \cdot f$ | | | | $-0.103759 \cdot f$ |
| $L_V$ | $r_8=-0.520511 \cdot f$ | $d_5=0.15358 \cdot f$ | 1.66672 | 48.4 | $+1.280895/f$ |
| | | $l_3=0.00284 \cdot f$ | | | |
| | $r_9=-1.928320 \cdot f$ | $d_6=0.06257 \cdot f$ | 1.74400 | 44.7 | $-0.385828/f$ |
| $L_{VI}$ | $r_{10}=-0.584018 \cdot f$ | | | | $+1.273933/f$ |

$r$ being the radii of the surfaces, $d$ the thicknesses of the individual lenses $I_I \ldots L_{VI}$, $l$ the air separations between the individual elements, $n_d$ the refractive indices, $v$ the Abbe numbers and $\Delta n/r$ the refractive powers of the individual surfaces.

References Cited in the file of this patent

UNITED STATES PATENTS

| | | |
|---|---|---|
| 1,168,873 | Florian | Jan. 18, 1916 |
| 1,463,132 | Graf | July 24, 1923 |
| 1,945,570 | Rudolph | Feb. 6, 1924 |
| 2,084,309 | Bertele | June 22, 1937 |
| 2,341,385 | Kingslake | Feb. 8, 1944 |
| 2,446,402 | Aklin | Aug. 3, 1948 |
| 2,670,659 | Tronnier | Mar. 2, 1954 |